United States Patent
Cho et al.

(10) Patent No.: US 8,692,788 B2
(45) Date of Patent: Apr. 8, 2014

(54) FLAT PANEL DISPLAY DEVICE WITH TOUCH SCREEN

(75) Inventors: Sun-Haeng Cho, Hwaseong-si (KR); Byeong Kyu Jeon, Busan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 244 days.

(21) Appl. No.: 13/179,069

(22) Filed: Jul. 8, 2011

(65) Prior Publication Data
US 2012/0154302 A1  Jun. 21, 2012

(30) Foreign Application Priority Data

Dec. 15, 2010  (KR) .................. 10-2010-0128418

(51) Int. Cl.
*G06F 3/041*  (2006.01)
(52) U.S. Cl.
USPC .......................................... 345/173; 349/110
(58) Field of Classification Search
USPC ................. 345/156, 173, 174, 179; 178/18.05–18.07, 19.03; 349/110
See application file for complete search history.

(56) References Cited

U.S. PATENT DOCUMENTS

| 6,281,868 | B1* | 8/2001 | Takeuchi et al. | 345/90 |
| 2004/0001177 | A1* | 1/2004 | Byun et al. | 349/187 |
| 2005/0134764 | A1* | 6/2005 | Jeoung et al. | 349/110 |
| 2009/0207151 | A1 | 8/2009 | Liu et al. | |
| 2010/0103121 | A1 | 4/2010 | Kim et al. | |
| 2011/0267290 | A1* | 11/2011 | Park et al. | 345/173 |
| 2011/0285640 | A1* | 11/2011 | Park et al. | 345/173 |
| 2012/0103777 | A1* | 5/2012 | Kang | 200/600 |
| 2012/0113032 | A1* | 5/2012 | Itakura et al. | 345/173 |
| 2012/0146922 | A1* | 6/2012 | Kang et al. | 345/173 |
| 2012/0154725 | A1* | 6/2012 | Jeon et al. | 349/110 |
| 2012/0327325 | A1* | 12/2012 | Park et al. | 349/58 |

FOREIGN PATENT DOCUMENTS

| KR | 10-2009-0114722 A | 11/2009 |
| KR | 10-2010-0046891 A | 5/2010 |

* cited by examiner

*Primary Examiner* — Joe H Cheng
(74) *Attorney, Agent, or Firm* — Christie, Parker & Hale, LLP

(57) ABSTRACT

A flat panel display device with touch screen is provided. The flat panel display device includes a substrate, a black matrix, a ground line, and a ground line contact. The substrate includes an active region, and an inactive region surrounding the active region. The black matrix is disposed on the substrate in the inactive region, and includes a metal. The ground line is disposed on the black matrix, in the inactive region. The ground line contact electrically connects the ground line to the black matrix.

11 Claims, 2 Drawing Sheets

FLAT PANEL DISPLAY DEVICE WITH TOUCH SCREEN

CROSS-REFERENCE TO RELATED APPLICATION

This patent application claims priority to and the benefit of Korean Patent Application No. 10-2010-0128418, filed on Dec. 15, 2010, in the Korean Intellectual Property Office, the entire content of which is herein incorporated by reference.

BACKGROUND

1. Field

The present disclosure herein relates to an input device, and more particularly, to a flat panel display device with touch screen.

2. Description of Related Art

Touch screen panels are input devices that allow a user's command to be inputted by selecting indication content displayed on a screen such as an image display device by hand of the user or object.

The touch screen panels are disposed in the front faces of the image display devices and convert a touch position, which is directly touched by the user's hand or an object controlled by the user, into an electrical signal. Since such touch screen panels may replace separate input devices that are connected to the image display devices and operate like keyboards and mouses, their application fields are increasingly being expanded.

Resistive touch screen panels, light sensing touch screen panels and capacitive touch screen panels are types of the touch screen panels. Among these, the capacitive touch screen panels sense the change of a capacitance that is formed by a conductive sensing pattern and another peripheral sensing pattern or a ground electrode when a user's hand or an object is touched thereto, thereby converting a touch position into an electrical signal.

SUMMARY

An aspect of an embodiment of the present invention is directed toward a flat panel display device with touch screen, which has an improved operation characteristic.

An embodiment of the present invention provides a flat panel display device with touch screen which includes: a substrate including an active region, and an inactive region surrounding the active region; a black matrix disposed on the substrate in the inactive region, and including a metal; a ground line disposed on the black matrix, in the inactive region; and a ground line contact electrically connecting the ground line to the black matrix.

In one embodiment, the black matrix includes chromium (Cr).

In one embodiment, the flat panel display device further includes: a conductive line disposed on the black matrix to be separated from the ground line; and a sensing pattern connected to the conductive line, and disposed in the active region.

In one embodiment, the flat panel display device further includes an overcoat layer covering the black matrix, on the substrate, wherein: the ground line and the conductive line are disposed on the overcoat layer, and the ground line contact passes through the overcoat layer.

In one embodiment, the flat panel display device further includes a transparent conductive oxide layer disposed between the conductive line and the overcoat layer, wherein the transparent conductive oxide layer electrically connects the conductive line and the sensing pattern.

In one embodiment, the ground line is directly in contact with the ground line contact.

In one embodiment, the ground line contact includes the same material as that of the ground line.

In one embodiment, the ground line and the ground line contact include a metal or graphene.

In one embodiment, the flat panel display device further includes a transparent conductive oxide layer disposed between the ground line and the ground line contact.

In one embodiment, the ground line contact includes the same material as that of the transparent conductive oxide layer.

In one embodiment, the transparent conductive oxide layer includes indium tin oxide (ITO).

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
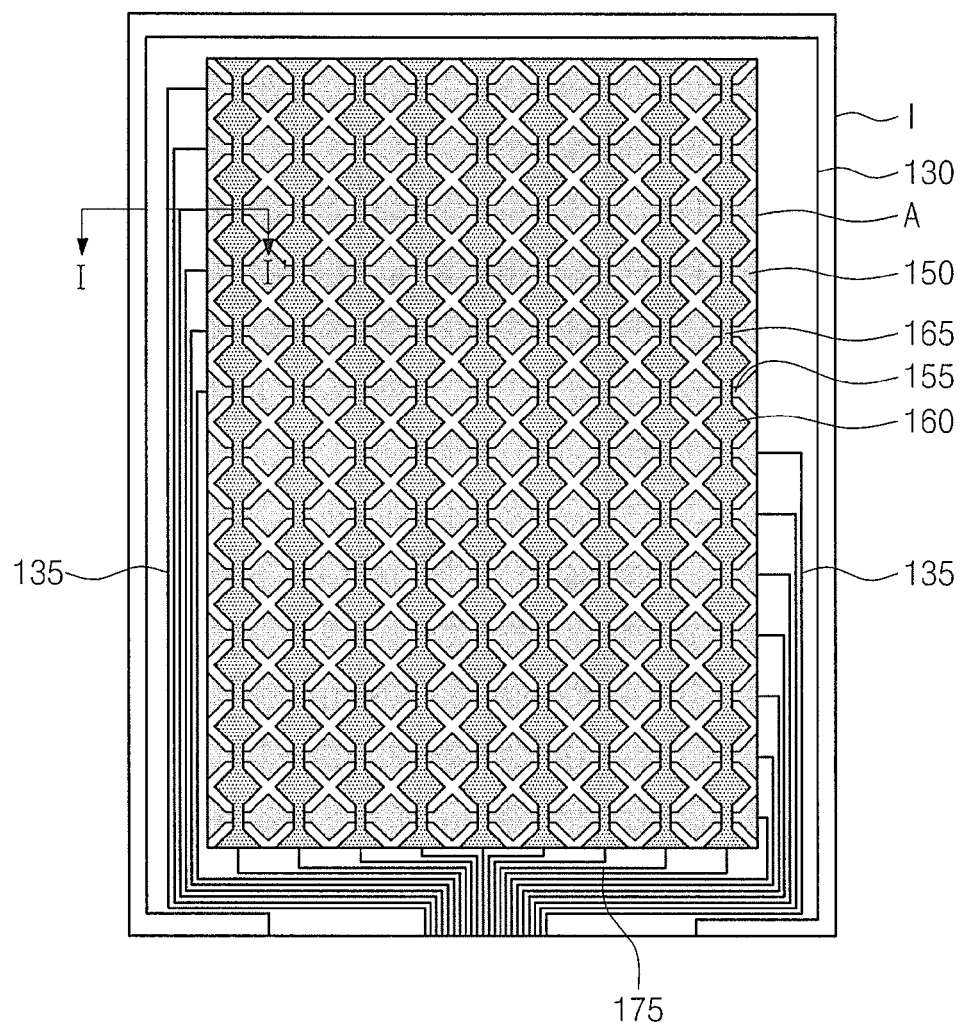
FIG. 1 is a plan view illustrating a flat panel display device with touch screen according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, it will be understood that when an element is referred to as being 'on' another element, it can be directly on the other element, or intervening elements may also be present. Also, in the figures, the dimensions of layers and regions are exaggerated for clarity of illustration. Like reference numerals refer to like elements throughout.

Additionally, the embodiment in the detailed description will be described with sectional views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes.

Also, though terms like a first, a second, and a third are used to describe various regions and layers in various embodiments of the present invention, the regions and the layers are not limited to these terms. These terms are used only to distinguish one region or layer from another region or layer.

An embodiment described and exemplified herein includes a complementary embodiment thereof.

In the following description, the technical terms are used only to explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component, but does not exclude other properties, regions, fixed numbers, steps, processes, elements and/or components.

Figure 2:
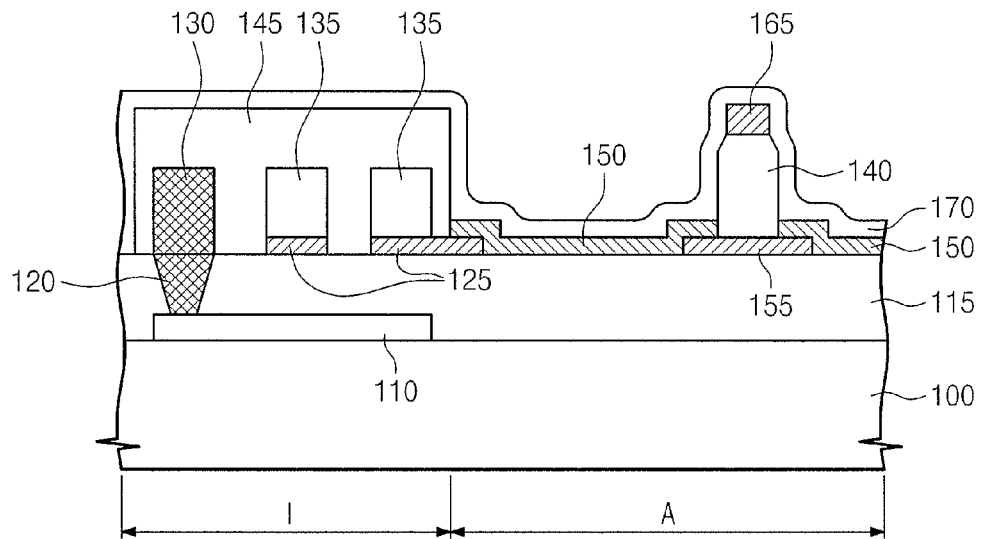
FIG. 2 is a cross-sectional view taken along line I-I' of FIG. 1.

FIGS. 1 and 2 are respectively a plan view and a cross-sectional view illustrating a flat panel display device with touch screen according to an embodiment of the present invention. Here, FIG. 2 is the cross-sectional view taken along line I-I' of FIG. 1.

FIGS. 1 and 2 illustrate a substrate 100 which includes an active region A, and an inactive region I surrounding the active region A. The bottom of the substrate 100 may be a portion that is touched by a user's hand or an object. The substrate 100 may include (or be formed of) a glass substrate. In the inactive region I, a black matrix 110 including a metal is disposed on the substrate 100. The black matrix 110 may include chromium (Cr). On the other hand, when the black matrix 110 is formed as an organic layer, it may be difficult for the black matrix 110 to have a fine pattern (for example, a decoration and a logo), and its thickness may be large.

In the inactive region I, a ground line 130 is disposed on the black matrix 110. The ground line 130 may include a conductive material, for example, a metal or graphene. The ground line 130 may protect from the effect caused by external static electricity. A ground line contact 120 that electrically connects the ground line 130 to the black matrix 110 is also disposed.

A plurality of first conductive lines 135 separated from the ground line 130 are disposed on the black matrix 110. A plurality of first sensing patterns 150 connected to the first conductive lines 135 are disposed in the active region A. The first conductive lines 135 may transfer the capacitive charge of the first sensing patterns 150 to an integrated circuit. The first sensing patterns 150, as illustrated in FIG. 1, may have a diamond shape. On the other hand, the first sensing patterns 150 may have various other suitable shapes. The first sensing patterns 150 may be connected to each other in the X-axis direction. A plurality of sensing patterns 160 that are connected in the Y-axis direction intersecting (crossing) the X-axis direction may be disposed in the active region A. The second sensing patterns 160 may be electrically connected to a second conductive line 175. The first sensing patterns 150 are disposed to be electrically insulated from the second sensing patterns 160. A relationship (which will be described below) between the first conductive line 135 and the first sensing patters 150 may be identically applied to a relationship between the second conductive line 175 and the second sensing patterns 160.

An overcoat layer 115 covering the black matrix 110 is disposed on the substrate 100. The overcoat layer 115 may cover the entire top of the substrate 110. The overcoat layer 115 may provide a flat top surface. The overcoat layer 115 may include an organic layer. The ground line 130 and the first conductive lines 135 are disposed on the overcoat layer 115. The ground line contact 120 may electrically connect the ground line 130 and the black matrix 110 through the overcoat layer 115. When the ground line contact 120 is not provided, the first conductive line 135 and the black matrix 110 may generate a parasitic capacitance. According to an embodiment of the present invention, the ground line contact 120 is provided, and thus the first conductive line 135 and the black matrix 110 do not generate a parasitic capacitance.

A transparent conductive oxide layer 125 is disposed between the overcoat layer 115 and the first conductive lines 135. The transparent conductive oxide layer 125 may electrically connect the first conductive lines 135 and the first sensing patterns 150 at a boundary between the active region A and the inactive region I. The first sensing patterns 150 may be connected by a first bridge pattern 155 in the active region A. The first bridge pattern 155 and the first sensing patterns 150 may include a transparent material, for example, indium tin oxide (ITO) or graphene. A first organic layer pattern 140 is disposed on the first bridge pattern 155. A second bridge pattern 165 connecting the second sensing patterns 160 may be disposed on the top of the first organic pattern 140. As described above, the first sensing patterns 150 and the second sensing patterns 160 are disposed to be not electrically connected.

The ground line 130 may directly contact the ground line contact 120. Another layer, for example, a transparent conductive oxide layer may not be disposed between the ground line 130 and the ground line contact 120. The ground line contact 120 may include the same material as that of the ground line 130. The ground line contact 120 and the ground line 130 may include a metal or graphene. A second organic layer pattern 145 (covering the ground line 130 and the first and second conductive lines 135 and 175) may be disposed in the inactive region I. The second organic layer pattern 145 may include the same material as that of the first organic layer pattern 140. In addition, an inorganic layer 170 may be provided to cover the first and second organic layer patterns 140 and 145 and the first and second sensing patterns 150 and 160. The inorganic layer 170 may include silicon oxide. The inorganic layer 170 may serve as a passivation layer.

Herein, the first and second conductive lines 135 and 175, the first and second sensing patterns 150 and 160, the ground line 130, the ground line contact 120, the transparent conductive oxide layer 125, and the first and second bridge patterns 155 and 165 may be formed of conductive materials. For example, the each line may be formed of a material that is selected from among metals such as aluminum (Al), chromium (Cr) and silver (Ag), metal oxides such as ITO, indium zinc oxide (IZO) and indium tin zinc oxide (ITZO), and graphene according to each condition such as conductivity or transparency. Also, some of the lines may be formed of a metal, and the other lines may be formed of graphene.

Figure 3:
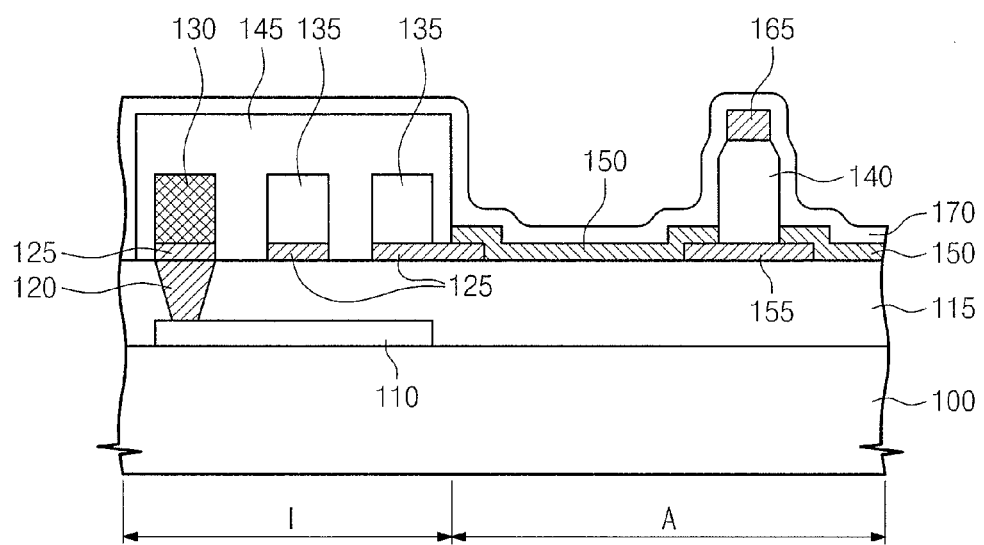
FIG. 3 is a cross-sectional view illustrating a flat panel display device with touch screen according to another embodiment of the present invention, and is a cross-sectional view taken along line I-I' of FIG. 1.

FIG. 3 is a cross-sectional view illustrating a flat panel display device with touch screen according to another embodiment of the present invention, and is a cross-sectional view taken along line I-I' of FIG. 1. Hereinafter, for conciseness, the technical features that have been described above with reference to FIGS. 1 and 2 will be omitted.

Referring to FIGS. 1 and 3, unlike in FIG. 2, a transparent conductive oxide layer 125 may be disposed between the ground line 130 and the ground line contact 120. The transparent conductive oxide layer 125 may be disposed between a first metal contact 135 and the overcoat layer 115. The ground line contact 120 may include the same material as that of the transparent conductive oxide layer 125. The ground line contact 120, for example, may include ITO.

When the ground line contact 120 is not provided, the first metal contact 135 and the black matrix 110 may generate a parasitic capacitance. According to another embodiment of the present invention, the ground line contact 120 is provided, and thus the first metal contact 135 and the black matrix 110 can prevent the parasitic capacitance from being generated.

According to the embodiments of the present invention, provided is the ground line contact that connects the ground line and the black matrix. A parasitic capacitance, which may be generated between the conductive line and the black matrix formed of a metal, can be prevented by the ground line contact. Accordingly, signal failure due to the parasitic capacitance improves, and thus operation characteristic of the flat panel display device with touch screen can be enhanced.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A flat panel display device with touch screen, comprising:
    a substrate comprising an active region, and an inactive region surrounding the active region;
    a black matrix on the substrate in the inactive region, and comprising a metal;
    a ground line on the black matrix, in the inactive region;
    a ground line contact electrically connecting the ground line to the black matrix; and
    an overcoat layer covering the black matrix, on the substrate, wherein:
        the ground line is on the overcoat layer, and
        the ground line contact penetrates through the overcoat layer.

2. The flat panel display device of claim 1, wherein the black matrix comprises chromium (Cr).

3. The flat panel display device of claim 1, further comprising:
    a conductive line on the black matrix to be spaced apart from the ground line; and
    a sensing pattern connected to the conductive line, and in the active region.

4. The flat panel display device of claim 1, wherein the ground line is directly in contact with the ground line contact.

5. The flat panel display device of claim 4, wherein the ground line contact comprises the same material as that of the ground line.

6. The flat panel display device of claim 5, wherein the ground line and the ground line contact comprise a metal or graphene.

7. The flat panel display device of claim 1, further comprising a transparent conductive oxide layer between the ground line and the ground line contact.

8. The flat panel display device of claim 7, wherein the ground line contact comprises the same material as that of the transparent conductive oxide layer.

9. The flat panel display device of claim 8, wherein the transparent conductive oxide layer comprises indium tin oxide (ITO).

10. A flat panel display device with touch screen comprising:
    a substrate comprising an active region, and an inactive region surrounding the active region;
    a black matrix on the substrate in the inactive region, and comprising a metal;
    a ground line on the black matrix, in the inactive region;
    a ground line contact electrically connecting the ground line to the black matrix;
    a conductive line on the black matrix to be spaced apart from the ground line;
    a sensing pattern connected to the conductive line, and in the active region; and
    an overcoat layer covering the black matrix, on the substrate,
    wherein,
        the ground line and the conductive line are both on the overcoat layer, and
        the ground line contact penetrates through the overcoat layer.

11. The flat panel display device of claim 4, further comprising a transparent conductive oxide layer between the conductive line and the overcoat layer,
    wherein the transparent conductive oxide layer electrically connects the conductive line with the sensing pattern.

* * * * *

UNITED STATES PATENT AND TRADEMARK OFFICE
CERTIFICATE OF CORRECTION

PATENT NO. : 8,692,788 B2
APPLICATION NO. : 13/179069
DATED : April 8, 2014
INVENTOR(S) : Sun-Haeng Cho et al.

It is certified that error appears in the above-identified patent and that said Letters Patent is hereby corrected as shown below:

In the Claims

Column 6, Claim 11, line 36     Delete "claim 4,"

Insert -- claim 10, --

Signed and Sealed this
Fifteenth Day of December, 2015

Michelle K. Lee
*Director of the United States Patent and Trademark Office*